Feb. 7, 1961   F. G. BACK ET AL   2,970,516
MULTIPLE ELEMENT VARIFOCAL SYSTEM
Filed Jan. 14, 1957
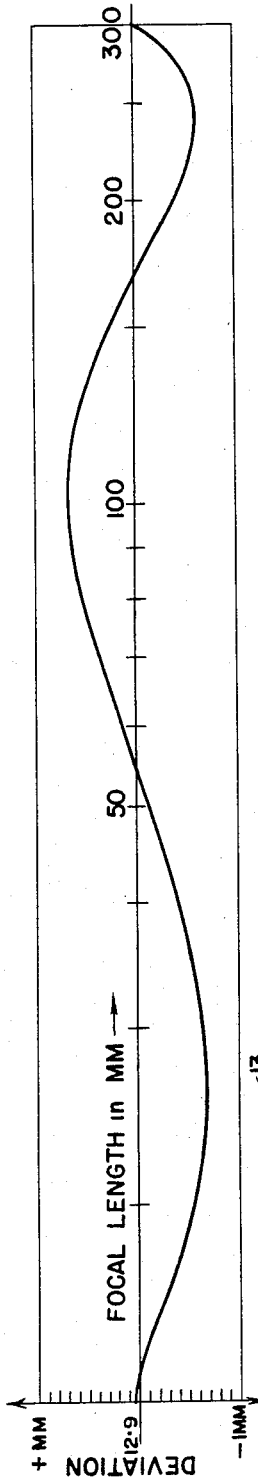
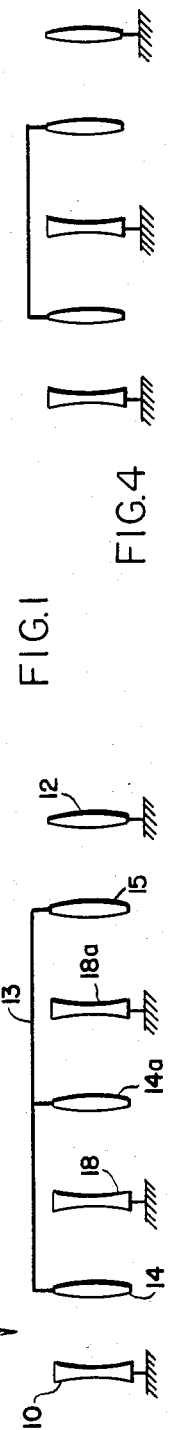
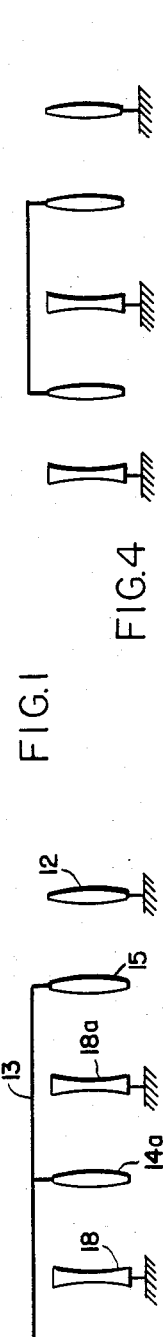
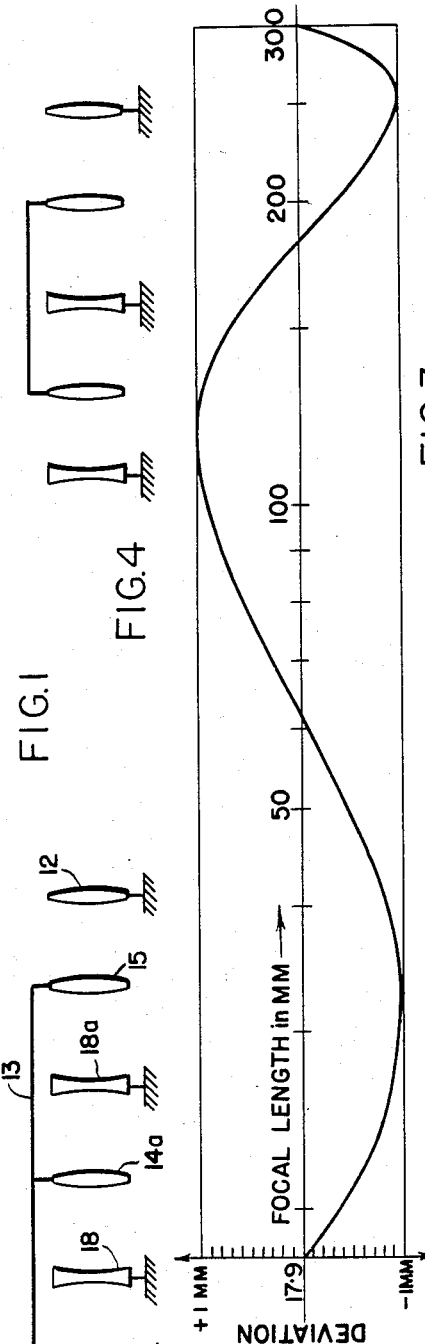
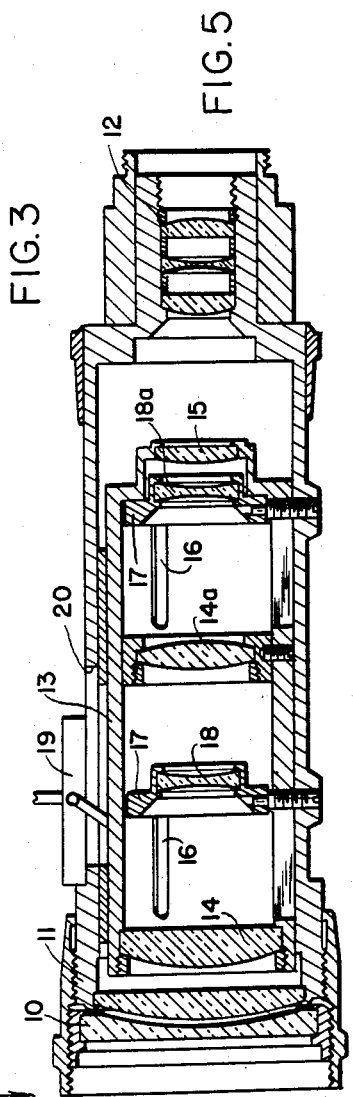
INVENTORS:
Frank G. Back
Herbert Lowen
BY Albert F. Kronman
ATTORNEY United States Patent Office 2,970,516
Patented Feb. 7, 1961

2,970,516

MULTIPLE ELEMENT VARIFOCAL SYSTEM

Frank G. Back, Lattingtown, N.Y., and Herbert Lowen, 11 LaMarcus Ave., Thompson Park, Glen Cove, N.Y.

Filed Jan. 14, 1957, Ser. No. 633,865

1 Claim. (Cl. 88—57)

This invention relates to varifocal lenses for use in conjunction with photographic, television apparatus and the like.

Varifocal lenses are lenses which permit of the changing of their focal length while keeping the final image stationary within the receptor plane. Such lens systems fall generally into two groups: The first group keeps the image stationary by mechanical means which effect at least two non-linearly linked movements. The second group of varifocal lenses employ optical compensation, in which only a single movable barrel-member is required to keep the image stationary.

The present invention is directed to optically compensated varifocal lenses. Such lenses have been disclosed generally in U.S. Patent No. 2,454,686, issued to Frank G. Back, November 23, 1948 and Patent No. 2,718,817 issued to Frank G. Back and Herbert Lowen, September 27, 1955. The basic structure of the optically compensated lens system is illustrated by the above patents and consists of a stationary front lens, a movable variator, a stationary erector, a movable compensator and a stationary relay lens.

Presently known optically compensated varifocal lenses consist of no more than five alternately stationary and movable lens groups. It has been found that by adding further movable and stationary lens groups to presently known varifocal lens systems, an increase in range can be achieved, while at the same time reducing deviation between the compensation points. Heretofore optically compensated varifocal systems were limited in that they were characterized by fairly large deviation between the points of full compensation. The extent of the image deviation determines the magnification range over which an optically compensated varifocal lens can be used.

Accordingly, it is an object of the present invention to provide an optically compensated varifocal lens, having increased range and reduced deviation between compensation points.

Another object of the present invention is to provide a varifocal lens, in which the usable range is increased without increasing the image deviation of the system.

A feature of the present invention is its use of a plurality of variators and a plurality of erector lenses located behind each of the movable variator lenses.

Another feature of the present invention is its use of a plurality of positive variator lenses, alternating with a plurality of erector lenses to produce the varifocal effect.

The invention consists of the construction, combination and arrangement of parts, as herein illustrated, described and claimed.

In the accompanying drawing, forming a part hereof, is illustrated one form of embodiment of the invention, in which:

Figure 1 is a graphical representation of the deviation plotted as a function of the focal length of a lens made in accordance with the present invention.

Figure 2 is a somewhat diagrammatic showing of the varifocal lens system described herein.

Figure 3 is a graphical representation showing the deviation plotted as a function of the focal length in the varifocal lens system shown in Figure 4.

Figure 4 is a somewhat diagrammatic representation of a varifocal lens system employing only one variator and one compensator.

Figure 5 is a view in longitudinal section of one embodiment of a varifocal lens system made in accordance with the present invention.

Referring to the drawings, and specifically to Figs. 2 and 5, 10 indicates a front lens which is mounted within a stationary barrel 11, such as is shown in Fig. 5. A relay 12 is secured to the other end of the outer barrel 11. Slidably carried within the outer barrel is an intermediate barrel 13 diagramatically illustrated by the bracket in Fig. 2. A plurality of variators 14, 14a and a compensator 15 are carried by the intermediate barrel 13. The intermediate barrel 13 is provided with spaced longitudinal slots 16, whereby a plurality of inner barrels 17 may be fixedly secured to the outer barrel 11 without interfering with the longitudinal travel of the intermediate barrel 13. An erector lens 18, 18a is carried by each of the inner barrels 17 as shown in Fig. 5. Suitable mechanical linkage indicated at 19 in Fig. 5 is provided by means of an access slot 20 in the outer barrel 11 for moving the intermediate barrel to produce the varifocal effect.

In the embodiment illustrated, the lenses are in the following order: front lens 10, variator 14, erector 18, second variator 14a, second erector 18c, compensator 15 and relay 12. However, it is to be understood that the present concept is broader than the use of two variators and two erectors and contemplates employing a plurality of variators alternating with a plurality of erectors followed by a compensator for the purpose of achieving vastly improved varifocal lens systems.

The use of positive variators and compensators alternating with negative erectors, as illustrated, may be changed in accordance with well known optical practices without departing from the spirit of the invention. Thus for example, all of the lenses may be positive or the variators may be negative lenses with the erectors as positive lenses.

An illustration of a preferred embodiment of such a system of increased range and reduced deviation, is as follows:

|  | Diopters |
|---|---|
| Front lens | − 3.571 |
| First variator | + 6.573 |
| First erector | −11.031 |
| Second variator | +13.554 |
| Second erector | −28.968 |
| Compensator | +13.554 |
| Relay | + 4.906 |

The total movement of the intermediate barrel is 80 mm. and it varies the focal length from 12.9 mm. to 300 mm., corresponding to a range of 1:23.3. The maximum image shift is 0.65 mm.

Figure 1 shows this deviation plotted as function of the focal length.

For comparison purposes an equivalent system with only one variator and one compensator shall be given.

|  | Diopters |
|---|---|
| Front lens | − 6.997 |
| Variator | +14.689 |
| Erector | −31.394 |
| Compensator | +14.689 |
| Relay | + 4.656 |

This system has been equalized with the previous cited example in such a way that the total barrel movement is also 80 mm. and the maximum focal length 300 mm.

In both lenses the end points of the zoom are compensated and both minimum deviations and the maximum deviation are numerically equal.

The minimum focal length is 17.8 mm. corresponding to a range of only 1:16.8. In spite of the smaller range the maximum deviation is ±1 mm.

Fig. 3 graphically shows this deviation plotted as a function of the focal length.

From the foregoing it will be seen that there has been provided a varifocal lens system of greatly improved range and decreased image deviation, which overcomes the limitations which were previously considered inherent in optically compensated varifocal lens systems.

Having thus fully described the invention, what is claimed as new and desired to be secured by Letters Patent of the United States, is:

A varifocal lens system comprising in axial alignment in the order of the light path, a front lens to receive light from the object and form a stationary image of fixed size, a first movable variator lens to receive light from the front lens and to form an image of variable size and position the image formed by the front lens, a fixed first erector lens adapted to receive light from the first variator and invert the image formed by the first variator, a second movable variator lens adapted to receive light from the first erector and further change the size and position of the image formed by the first erector lens, a second stationary erector lens adapted to receive light from the second variator and to invert the image formed by the second variator, a movable compensator lens adapted to receive the light from the second stationary erector lens and keep the image of variable size and position formed by the second erector lens substantially stationary in space, a relay lens adapted to receive light from the said compensator and to form an image of the stationary image formed by the compensator in the film plane, said movable lenses having a total movement of 80 mm. whereby the focal length is varied from 12.9 mm. to 300 mm. corresponding to a range of 1:23.3 with a maximum image shift of 0.65 mm., and in which the lens elements have the following powers:

|  | Diopters |
|---|---|
| Front lens | − 3.751 |
| First variator | + 6.573 |
| First erector | −11.031 |
| Second variator | +13.554 |
| Second erector | −28.986 |
| Compensator | +13.554 |
| Relay | + 4.906 |

References Cited in the file of this patent
UNITED STATES PATENTS

| 2,454,686 | Back | July 30, 1946 |
| 2,566,485 | Cuvillier | Sept. 4, 1951 |
| 2,718,817 | Back et al. | Sept. 27, 1955 |
| 2,778,272 | Reymond | Jan. 22, 1957 |
| 2,906,171 | Bergstein | Sept. 29, 1959 |